(12) United States Patent
McMahon et al.

(10) Patent No.: US 7,922,833 B2
(45) Date of Patent: Apr. 12, 2011

(54) GAS REGULATOR FOR THERMAL ENERGY MACHINING

(75) Inventors: Kieran McMahon, Limerick (IE);
Eamonn O'Halloran, Clare (IE)

(73) Assignee: Kennametal Inc., Latrobe, PA (US)

(*) Notice: Subject to any disclaimer, the term of this patent is extended or adjusted under 35 U.S.C. 154(b) by 480 days.

(21) Appl. No.: 12/185,949

(22) Filed: Aug. 5, 2008

(65) Prior Publication Data

US 2010/0032022 A1    Feb. 11, 2010

(51) Int. Cl.
*F17D 1/16* (2006.01)
*F16K 31/12* (2006.01)

(52) U.S. Cl. .............. 148/203; 266/51; 266/89; 137/14

(58) Field of Classification Search .............. 148/202, 148/203; 266/48, 51, 89; 137/14, 487.5
See application file for complete search history.

(56) References Cited

U.S. PATENT DOCUMENTS

| | | |
|---|---|---|
| 3,901,488 A | 8/1975 | Riddle |
| 3,994,668 A | 11/1976 | Leisner et al. |
| 4,094,339 A | 6/1978 | Leisner et al. |
| 4,147,333 A | 4/1979 | Wirth |
| 4,275,752 A * | 6/1981 | Collier et al. ............ 137/7 |
| 4,394,334 A | 7/1983 | Kiss |
| 4,474,547 A * | 10/1984 | Drexel et al. ............ 431/1 |
| 4,486,173 A | 12/1984 | Hieber et al. |
| 4,487,576 A | 12/1984 | Martini |
| 4,513,194 A | 4/1985 | Mastromatteo |
| 4,543,570 A | 9/1985 | Bressert et al. |
| 4,561,839 A | 12/1985 | Neumann |
| 4,595,359 A | 6/1986 | Conrad et al. |
| 4,635,153 A | 1/1987 | Shimamura et al. |
| 4,712,998 A | 12/1987 | Conrad |
| 4,721,458 A | 1/1988 | Conrad |
| 4,740,152 A | 4/1988 | Conrad et al. |
| 4,796,868 A | 1/1989 | Bozhko et al. |
| 4,826,541 A | 5/1989 | Bozhko et al. |
| 4,883,051 A | 11/1989 | Westenskow et al. |
| 4,925,499 A | 5/1990 | Wohr |
| 4,936,340 A | 6/1990 | Potter et al. |
| 4,961,441 A | 10/1990 | Salter |
| 5,531,959 A | 7/1996 | Johnson et al. |
| 5,636,653 A | 6/1997 | Titus |
| 5,728,325 A | 3/1998 | Blankenburg |
| 5,787,925 A | 8/1998 | Ollivier |

(Continued)

FOREIGN PATENT DOCUMENTS

GB    1525633    9/1978

(Continued)

*Primary Examiner* — Scott Kastler
(74) *Attorney, Agent, or Firm* — Matthew W. Smith

(57) ABSTRACT

A thermal energy machining ("TEM") machine gas handling system in which the improvement is a fluid-controlled pressure regulation subsystem for controlling the dispensing of a TEM process gas via the regulation of the pressure of the TEM process gas. Such subsystems include a pressure regulator, a pressure transducer, and a digital controller working in combination to control the process gas outlet pressure of the pressure regulator. The pressure regulator's diaphragm that controls the valve that regulates the process gas outlet pressure is mechanically acted upon by the piston of a pneumatic or hydraulic cylinder. Controlling the pneumatic or hydraulic cylinder regulates the output pressure of the process gas. The pressure transducer and the digital controller work in combination to adjust the feed pressure of the pneumatic or hydraulic cylinder, which in turn regulates the pressure of the process gas at the outlet of the pressure regulator.

17 Claims, 4 Drawing Sheets

U.S. PATENT DOCUMENTS

| | | | |
|---|---|---|---|
| 5,921,765 A | 7/1999 | Smith | |
| 5,937,854 A | 8/1999 | Stenzler | |
| 6,003,543 A | 12/1999 | Sulatisky et al. | |
| 6,056,008 A | 5/2000 | Adams et al. | |
| 6,423,936 B1 | 7/2002 | Reed | |
| 6,648,021 B2 | 11/2003 | Zheng et al. | |
| 6,713,016 B2 | 3/2004 | Kaercher et al. | |
| 6,758,233 B2 | 7/2004 | Sulatisky et al. | |
| 7,264,896 B2 | 9/2007 | Kelley et al. | |
| 7,605,341 B2 * | 10/2009 | Higgins et al. | 219/121.55 |
| 2002/0092564 A1 | 7/2002 | Ollivier | |
| 2004/0223885 A1 | 11/2004 | Keen et al. | |
| 2006/0192327 A1 | 8/2006 | La Gala | |
| 2007/0181198 A1 | 8/2007 | Larsen | |
| 2007/0221875 A1 | 9/2007 | Conrad | |
| 2008/0099069 A1 | 5/2008 | Cook | |

FOREIGN PATENT DOCUMENTS

| | | |
|---|---|---|
| JP | 58-218367 | 12/1983 |
| JP | 09094451 A | 4/1997 |
| WO | 2008019934 A1 | 2/2008 |
| WO | 2008028024 A2 | 3/2008 |
| WO | WO 2010/017022 A2 | 2/2010 |

* cited by examiner

GAS REGULATOR FOR THERMAL ENERGY MACHINING

FIELD OF THE INVENTION

The present invention relates to thermal energy machining ("TEM") machine gas handling systems having improved a fluid-controlled pressure regulation subsystem for controlling the dispensing of at least one of the TEM process gases.

DESCRIPTION OF THE RELATED ART

TEM was introduced in the late 1960's as an effective way to remove internal and external burrs and flashing from machined or molded metal and plastic parts. TEM is also known "gas detonation deburring," "thermal deburring," "combustion chamber treatment," and "rapid high energy removal of superfluous projections." The concept behind TEM is elegantly simple: instead of mechanically abrading off burrs and flashing, the burrs and flashing are simply burned away in a fraction of a second. This simple concept is applied in an exciting way: one or more metal or plastic parts requiring deburring or deflashing are sealed inside a combustion chamber and surrounded with a highly pressurized explosive gas mixture which is then ignited by an electric spark. The resulting explosion produces a thermal shock wave that literally burns away (oxidizes) the burrs and flashings from the parts while the relatively great thermal mass of the parts prevents the parts themselves from being damaged by the thermal shock wave. The explosive flame temperature can reach over 6,000° F. (3,316° C.). The explosion lasts only milliseconds and the entire load-to-load cycle time is on the order of half a minute. Descriptions of various aspects of TEM are found in U.S. Pat. No. 3,475,229, to Geen et al.; U.S. Pat. No. 3,666,252 to Rice; U.S. Pat. No. 3,901,488 to Riddle; U.S. Pat. No. 3,992,138 to Leisner; U.S. Pat. No. 3,994,668 to Leisner et al.; U.S. Pat. No. 4,025,062 to Johnstone et al.; U.S. Pat. No. 4,094,339 to Leisner et al.; U.S. Pat. No. 4,394,007 to Leisner; U.S. Pat. No. 4,394,334 to Kiss; U.S. Pat. No. 4,474,547 to Drexel et al.; U.S. Pat. No. 4,486,173 to Hieber et al.; U.S. Pat. No. 4,487,576 to Martini; U.S. Pat. No. 4,543,570 to Bressert et al.; U.S. Pat. No. 4,561,839 to Neumann; U.S. Pat. No. 4,595,359 to Conrad et al.; U.S. Pat. No. 4,712,998 to Conrad; U.S. Pat. No. 4,721,458 to Conrad; U.S. Pat. No. 4,740,152 to Conrad; U.S. Pat. No. 4,760,630 to Conrad et al.; U.S. Pat. No. 4,796,868 to Bozhko et al.; U.S. Pat. No. 4,819,917 to Cherendin et al.; U.S. Pat. No. 4,826,541 to Bozhko et al.; U.S. Pat. No. 4,925,499 to Wohr; U.S. Pat. No. 6,713,016 B2 to Kaercher et al.; and in U.S. Pat. Pub. Nos. US 2006/0192327 A1 of La Gala; US 2007/0221875 of Conrad; Great Britain Pat. No. 1 525 633 to Robert Bosch GmBH; and Patent Cooperation Treaty International Pat. Pub. No. WO 2008/019934 A1.

The explosive gas mixture typically comprises two process gases: one is an oxygen-source gas, usually oxygen, and the other is a fuel gas, e.g., hydrogen, methane, natural gas or a mixture thereof. Both the composition and mass of the gas mixture in the explosion chamber are critical to the success of the TEM process. The optimal gas mixture composition and the gas mixture amount for a given load of parts varies with the number, size, configuration, and material of the parts being treated. Precise metering of the process gases is used to achieve a desired mixture composition and to control the overall mass of the gas mixture in the combustion or explosion chamber. Too much of a gas mixture, even of the correct mixture composition, can result in an explosion that exceeds the safe operational conditions of the TEM machine.

The composition of the gas mixture may be determined by the mass ratio of the component process gases. Under the ideal gas law, the mass of a gas is proportional to its pressure for a predetermined volume and temperature. Thus, the mass ratio of the process gases can be controlled by controlling the pressures of the process gases either (1) directly entering the combustion chamber of the TEM machine, or (2) entering a fixed volume dosing device that is used to dose the gas into the combustion chamber. Accordingly, it is known in the art to adjust the respective pressures of the process gases to optimize the TEM process for the particular number, size, and material of the parts being treated.

Various methods have been used in the art to control the pressures of the process gases. The least sophisticated way to do this is to manually adjust output pressures of gas regulators for the process gases. More sophisticated ways have been developed over the years. For example, U.S. Pat. No. 4,721,458 to Conrad teaches using an automated feedback control system to control an electric drive system to dynamically adjust the diaphragm of a gas pressure regulator for one of the process gases and thereby control the output pressure of the pressure regulator. However, the electric drive systems have electric components in proximity to the areas in which flammable gases of the TEM process are used and so pose a risk of causing an unwanted explosion. What is needed is a safer automated system for controlling the pressures of the process gases in the TEM process.

SUMMARY OF THE INVENTION

The present invention provides an inherently safer system for controlling the pressures of the process gases in the TEM process than do the prior art systems which employ electric drives to control the diaphragm of a process gas pressure regulator. The present invention provides a TEM gas handling system in which the improvement is a fluid-controlled pressure regulation subsystem for controlling the dispensing of at least one of the TEM process gases via the regulation of the pressure of the TEM process gas either (1) directly to the combustion chamber or a mixing block or (2) indirectly to the combustion chamber or a mixing block by way of a fixed volume dosing device.

Such fluid-controlled pressure regulation subsystems include a pressure regulator, a pressure transducer, and a digital controller working in combination to control the process gas outlet pressure of the pressure regulator. In these subsystems of the present invention, the pressure regulator's diaphragm that controls the gas flow valve that regulates the process gas pressure at the pressure regulator outlet is mechanically acted upon by the piston of a pneumatic or hydraulic cylinder. Thus, by controlling the pneumatic or hydraulic cylinder, it is possible to regulate the output pressure of the process gas. The present invention employs the pressure transducer and the digital controller in combination to adjust the feed pressure of the pneumatic or hydraulic cylinder, which in turn regulates the process gas at the outlet of the pressure regulator. Thus, in contrast to the pressure regulation subsystem taught by U.S. Pat. No. 4,721,458 to Conrad, the pressure regulator of the present invention requires no electrical parts and therefore reduces the risk of an explosion occurring in that part of the TEM machine.

The present invention also includes TEM machines having the aforementioned improvements. Such TEM machines may also include a processing parameter electronic database containing process gas target pressure data for various part load characteristics, e.g., size, number, material type, etc., that can be used to control the process gas outlet pressure of the subsystem pressure regulators. Thus, according to one aspect of the present invention, a TEM machine operator may input the characteristics of the part load into an input device that electronically communicates with the database via a process controller to provide the subsystem digital controller with the target process gas output pressure at the pressure regulator and thereby automatically control the results of the TEM process.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF THE PREFERRED EMBODIMENTS

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Figure 1:
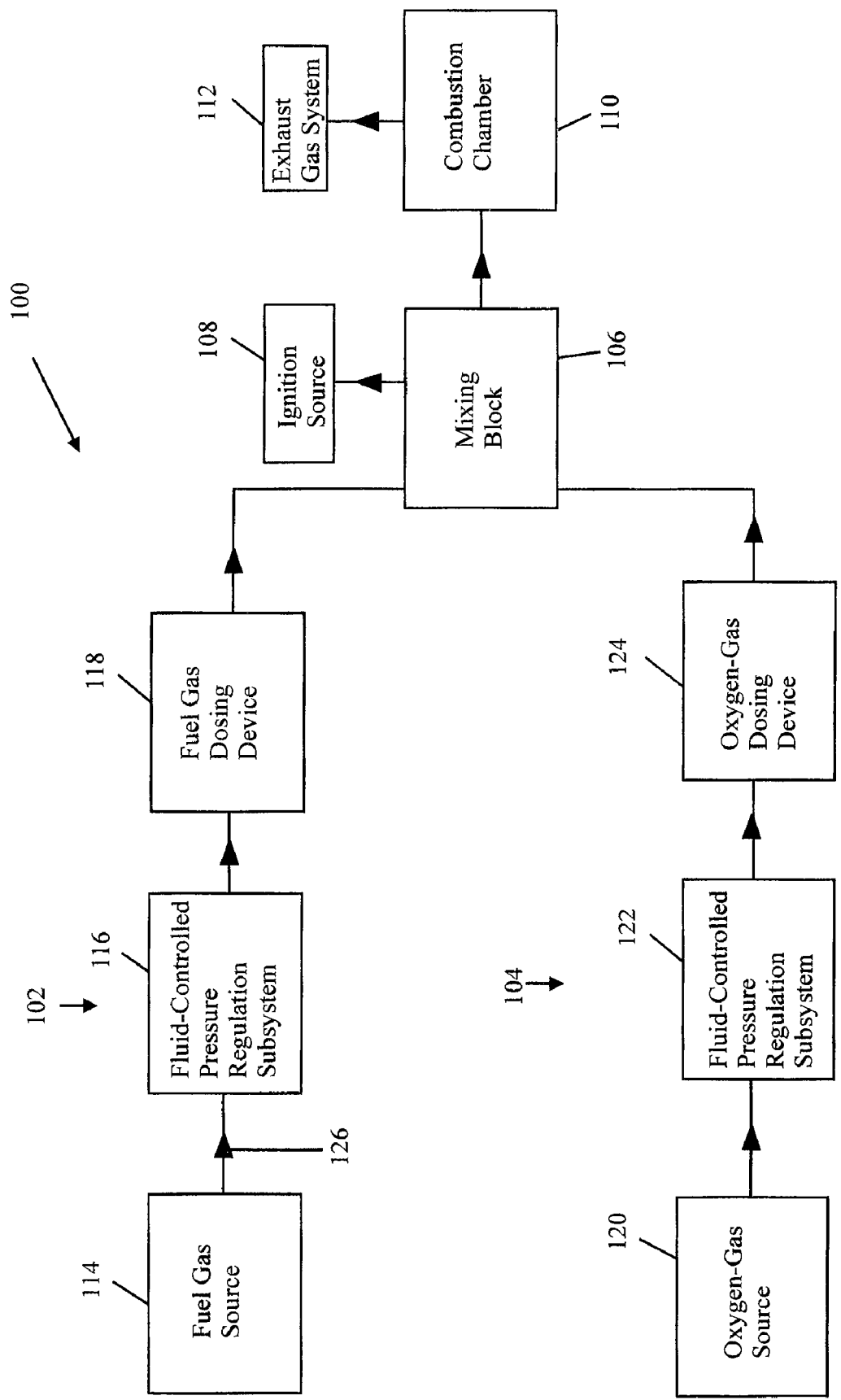
FIG. 1 is a schematic representation of a TEM machine according to an embodiment of the present invention.

Referring to FIG. 1, there is shown a schematic representation of a TEM machine 100 in accordance with an embodiment of the present invention. The TEM machine 100 comprises a fuel gas handling system 102, an oxygen gas handling system 104, a mixing block 106, an ignition source 108, a combustion chamber 110, and an exhaust gas system 112. The fuel gas handling system 102 comprises a high pressure fuel gas source 114, a fuel gas pressure regulation subsystem 116, and a fuel gas dosing device 118. Similarly, the oxygen gas handling system 104 comprises a high pressure oxygen gas source 120, an oxygen gas pressure regulation subsystem 122, and an oxygen gas dosing device 124. The direction of gas flow is shown by the arrows between the components, e.g., arrow 126.

In operation, the machined or injection molded parts that are to be deburred or deflashed are loaded into the combustion chamber 110 and the combustion chamber 110 is sealed. The atmosphere within the combustion chamber 110 may be evacuated/backfilled or purged to establish standard starting atmospheric conditions. (The subsystem of the TEM machine used to establish standard starting conditions is not identified in FIG. 1). The fuel gas handling system 102 is operated to provide the fuel gas that is needed to treat the parts within the combustion chamber 110. The fuel gas flows from the fuel gas source 114 to the fuel gas pressure regulator subsystem 116. The fuel gas pressure regulator subsystem 116 regulates the pressure of the fuel gas flowing to the fixed volume fuel gas dosing device 118 to fill the fuel gas dosing device 118 with the predetermined mass of fuel gas that is needed for processing the parts. Similarly, the oxygen gas flows from the oxygen gas source 120 to the oxygen gas pressure regulator subsystem 122. The oxygen gas pressure regulator subsystem 122 regulates the pressure of the oxygen gas flowing to the fixed volume oxygen gas dosing device 124 to fill the oxygen gas dosing device 124 with the predetermined mass of oxygen gas that is needed for processing the parts. The fuel gas and oxygen gas dosing devices, 118, 124 are simultaneously operated to inject their gases into the mixing block 106 to intimately mix the gases en route to the combustion chamber 110. When the combustion chamber 110 becomes filled with the requisite amounts of the fuel gas/oxygen gas mixture, the ignition source 108 is operated to explode the gas mixture. The explosion instantly burns away the burrs and/or flashings that are present on the parts. The excess pressure of the combusted gas mixture is released through the exhaust gas system 112 and the combustion chamber 110 is opened it to remove the deburred/deflashed parts.

Figure 2:
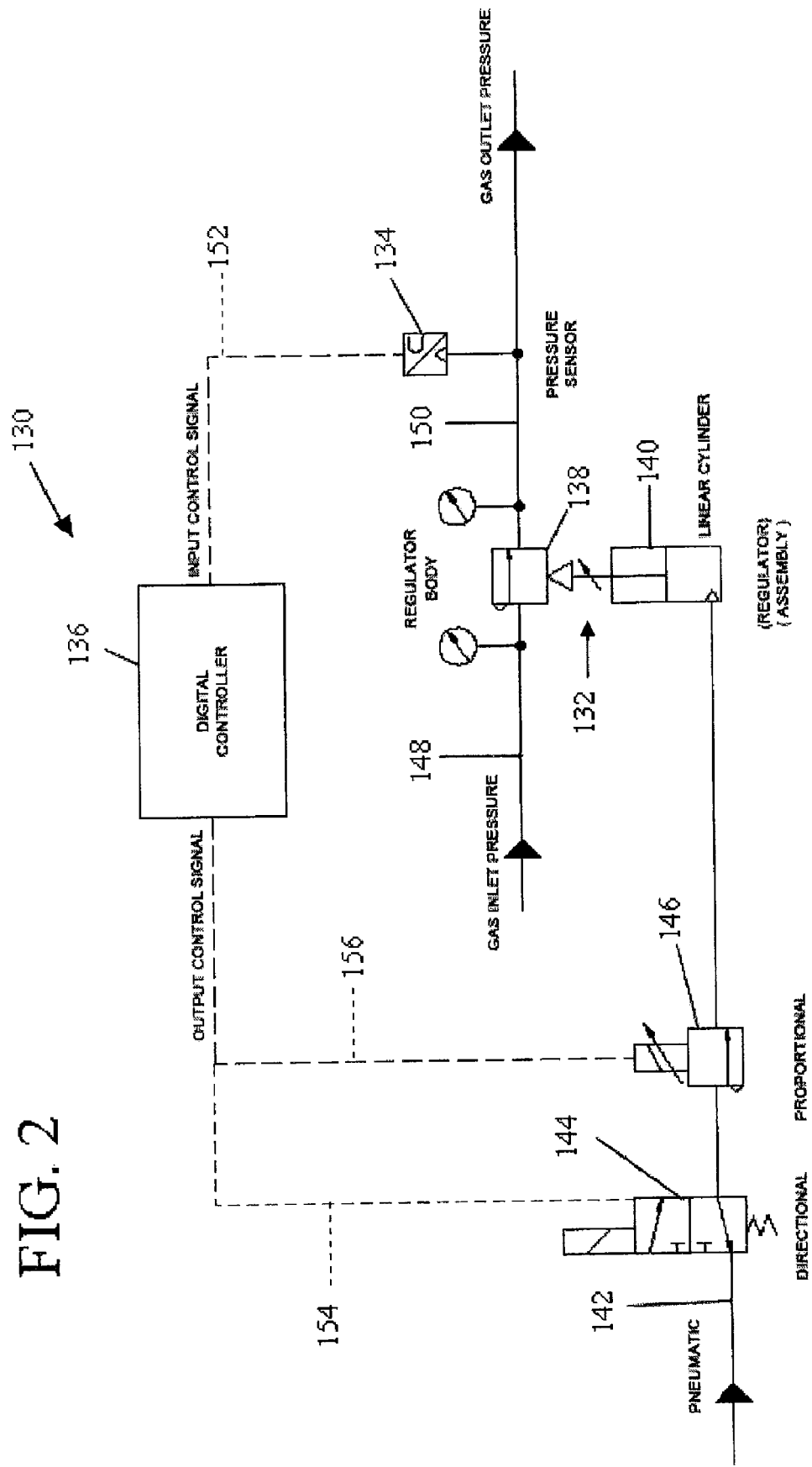
FIG. 2. is a schematic representation of a pneumatic-controlled pressure regulation subsystem for controlling the dispensing of at least one of the TEM process gases according to an embodiment of the present invention.

Referring now to FIG. 2, a preferred embodiment of a pneumatically-controlled pressure regulation subsystem 130 for controlling the dispensing of either the fuel gas or the oxygen gas via regulation of the process gas pressure is shown schematically using standard I.S.O. symbols. The pressure regulation subsystem 130 shown in FIG. 2 corresponds separately to the fuel gas pressure regulation subsystem 116 and the oxygen gas pressure regulator subsystem 122 of FIG. 1. The pressure regulation subsystem 130 comprises a pressure regulator 132, a pressure transducer 134, and a digital controller 136, which work in combination to control the process gas outlet pressure of the pressure regulator 132. As is described in more detail below, the pressure regulator 132 includes a regulator body 138 which is operationally connected to a linear cylinder 140. The linear cylinder 140 is supplied with pneumatic power from a source (not shown in FIG. 2), e.g., of compressed air, via a supply line 142 by way of a directional valve 144 and a proportional valve 146.

In operation, the process gas from the gas source, e.g., the fuel gas source 114 or the oxygen gas source 120 of FIG. 1, flows into the regulator body 138 via the input line 148 and out of it through the output line 150. The pressure transducer 134 is located on the output line 150 and senses the process gas output pressure from the pressure regulator 132. The pressure transducer 134 is in electronic communication with the digital controller 136, as is depicted by input communication line 152 (which can be a wire or a wireless communication line), to signal the output process gas pressure to the digital controller 136. The digital controller 136 determines whether or not the output pressure corresponds to a predetermined target pressure value and sends appropriate output signals to the directional valve 144 and the proportional valve 146 (as depicted by output communication lines 154, 156, which can be wire or wireless communication lines) so as to cause the linear cylinder 140 to adjust a diaphragm/valve combination (not shown in FIG. 2) in the regulator body 138 to achieve a target output pressure. The pressure adjustment loop continues until it is determined that the predetermined mass of gas has been provided to the relevant dosing device, e.g., fuel gas dosing device 118 or oxygen gas dosing device 124 of FIG. 1.

It is to be understood that a single digital controller may be used as part of the pressure regulation subsystems of all of the process gases, or each subsystem may have its own digital controller. Also, the digital controller(s) may be part of an overall process control processor of the TEM machine or it (they) may be separate from such an overall process controller.

Figure 3:
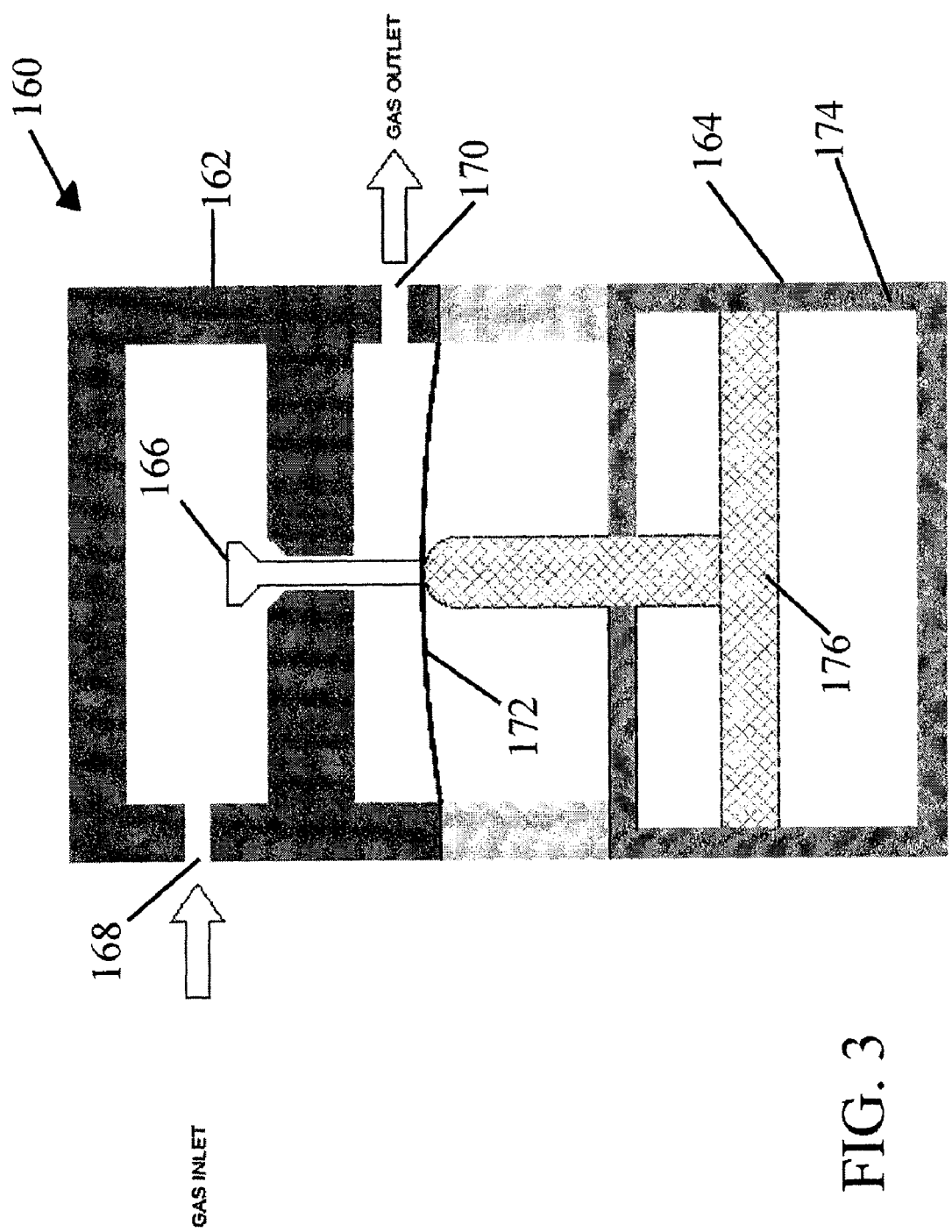
FIG. 3 is a schematic representation of a cross-section of a pressure regulator that is a component of the embodiment of the present invention shown in FIG. 2.

Referring now to FIG. 3, there is shown a schematic representation of a gas pressure regulator 160 according to an embodiment of the present invention. The pressure regulator 160 comprises a regulator top 162 and a linear cylinder 164. The regulator top 162 has a poppet valve 166 functionally interposed between a gas inlet 168 and a gas outlet 170. The regulator top 160 also has a diaphragm 172 in mechanical communication with the poppet valve 166 so that the flexure state of the diaphragm 172 controls the state of openness of the poppet valve 166. The linear cylinder 164 comprises a cylinder 174, a piston 176 moveably disposed therein, and at least one port (not shown in FIG. 3) for the ingress/egress of a control fluid, e.g., compressed air. The piston 176 is in mechanical communication with the underside of the diaphragm 172 so that the position of the piston 176 within the cylinder 174 controls the flexure state of the diaphragm 172.

In operation, a process gas flows into the gas regulator 160 via gas inlet 168, through poppet valve 166 and out of the gas regulator 160 via gas outlet 170. As is known by those skilled in the art, by controlling the rate of flow through the gas regulator 160, poppet valve 166 effectively controls the output pressure of the gas exiting through gas outlet 170. Because the openness state of poppet valve 166 is controlled by the flexure state of the diaphragm 172, which in turn is controlled by the position of the piston 176 within cylinder 174, the process gas output pressure of regulator 160 is controlled by controlling the operation of the linear cylinder 164.

It is to be specifically understood that although the valve that is positioned between the process gas inlet 168 and outlet 170 of the pressure regulator 160 is depicted in FIG. 3 as a poppet valve 166, the valve may be of any type known in the art is operable in conjunction with a pressure regulator diaphragm.

Figure 4:
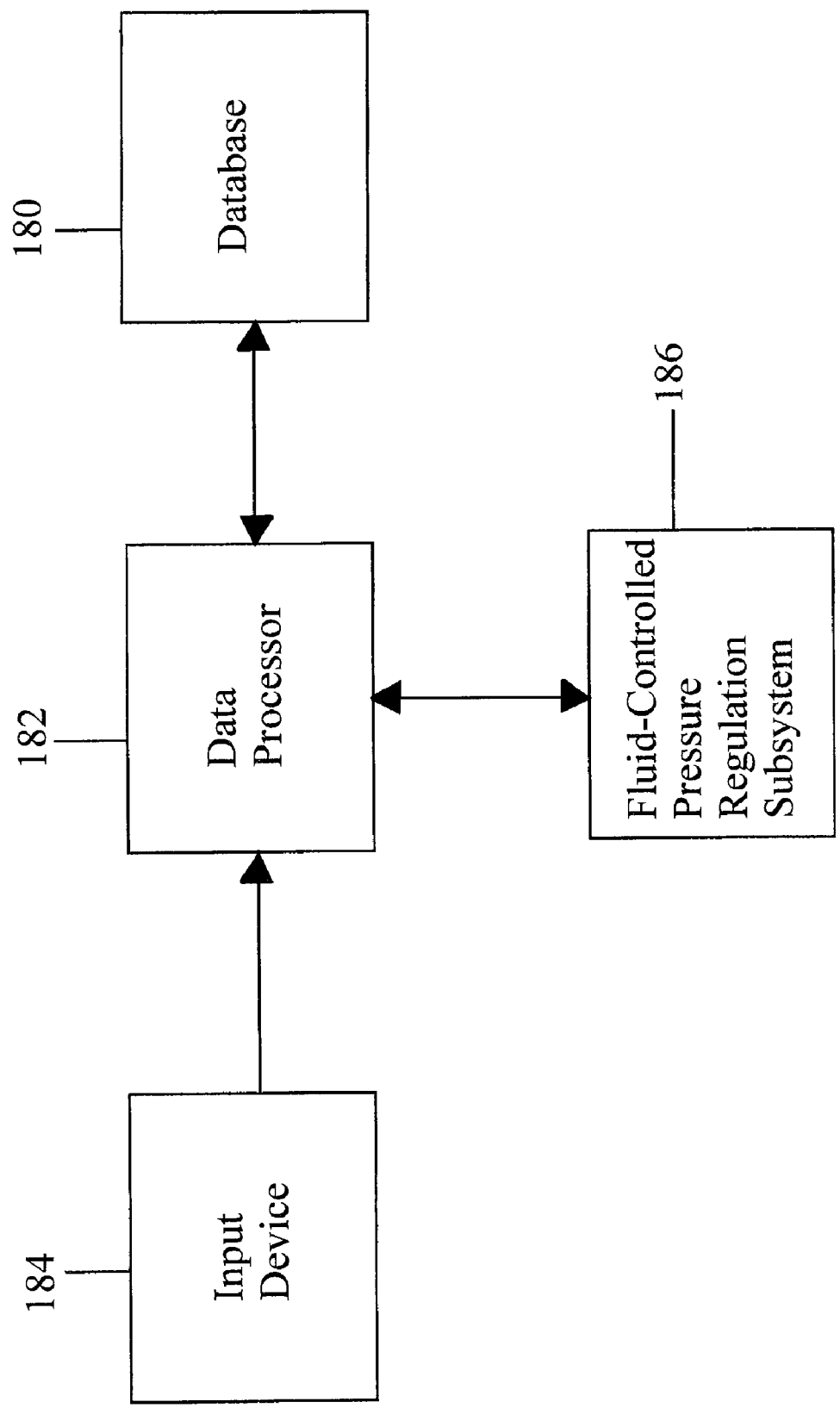
FIG. 4 is a schematic representation of a portion of a control system of a TEM machine in accordance with an embodiment of the present invention.

The present invention also includes TEM machines having an electronically-accessible processing parameter database containing process gas target pressure data for various part load characteristics, e.g., size, number, material type, etc., that can be used to control the process gas outlet pressure of the subsystem pressure regulators. Refer to FIG. 4, which shows a schematic representation of the database/pressure regulation system interaction. By using such a database 180, a TEM machine operator can automatically control the results of the TEM process by inputting the characteristics of the part load into a data processor 182 either by wire or wirelessly via an input device 184. The data processor 182 electronically communicates by wire or wirelessly with the database 180 to obtain data regarding the target gas output pressure value for the process gas pressure regulators of the respective fluid-controlled pressure regulation subsystems, e.g., fluid-controlled pressure regulation subsystem 186. The data recovered may be the relevant target pressure values, data from which the relevant target pressure values may be calculated, one or more algorithms for calculating the target pressure values, or any combination thereof. The data processor 182 subsequently communicates the target pressure value information by wire or wirelessly to the digital controller of the relevant fluid-controlled pressure regulation subsystem 186. The digital controller then controls its related process gas regulator to output the relevant process gas at the target pressure.

In TEM machines of some embodiments of the present invention, an overall process control processor or computer is used to control and/or monitor the operation of the TEM machine. In such embodiments, the database 180 and input device 184 may be associated with or part of such an overall process control processor. Likewise, in some embodiments the data processor 182 may be the overall process control processor or a part thereof.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

What is claimed is:

1. A TEM machine gas handling system in which the improvement is a fluid-controlled pressure regulation subsystem for controlling the dispensing of at least one of the TEM process gases, the fluid-controlled pressure regulation subsystem comprising:
   a) a pressure regulator having:
      1) a gas inlet and a gas outlet;
      2) a valve adapted to control process gas flow between the gas inlet and the gas outlet;
      3) a diaphragm in mechanical communication with the valve; and
      4) a fluid-controlled cylinder having a piston movably disposed therein in mechanical communication with the diaphragm;
   b) a pressure transducer in fluid communication with the gas outlet for monitoring the process gas pressure; and
   c) a digital controller adapted to receive a signal from the pressure transducer;
   wherein the digital controller uses the pressure transducer signal to control the position of the piston within the cylinder thereby controlling the flexure state of the diaphragm, the flexure state of the diaphragm controlling the openness state of the valve, the openness state of the valve controlling the process gas pressure exiting the gas outlet.

2. The TEM machine gas handling system of claim 1, wherein the fluid-controlled cylinder is a pneumatic cylinder.

3. The TEM machine gas handling system of claim 1, wherein the fluid-controlled cylinder is a hydraulic cylinder.

4. The TEM machine gas handling system of claim 1, wherein the valve is a poppet valve.

5. A method of deburring and/or deflashing parts comprising the steps of:
   a) providing a TEM machine having a fluid-controlled pressure regulation subsystem for controlling the dispensing of at least one of the TEM process gases, the fluid-controlled pressure regulation subsystem comprising:
      1) a pressure regulator having:
         i) a gas inlet and a gas outlet;
         ii) a valve adapted to control process gas flow between the gas inlet and the gas outlet;
         iii) a diaphragm in mechanical communication with the valve; and
         iv) a fluid-controlled cylinder having a piston movably disposed therein in mechanical communication with the diaphragm;
      2) a pressure transducer in fluid communication with the gas outlet for monitoring the process gas pressure; and
      3) a digital controller adapted to receive a signal from the pressure transducer;
   wherein the digital controller uses the pressure transducer signal to control the position of the piston within the cylinder thereby controlling the flexure state of the diaphragm, the flexure state of the diaphragm controlling the openness state of the valve, the openness state of the valve controlling the process gas pressure exiting the gas outlet;

b) loading parts having burrs and/or flashings into the TEM machine;

c) operating the TEM machine to remove the burrs and/or flashing from the parts; and d) unloading the parts from the TEM machine.

6. The method of claim 5, wherein the fluid-controlled cylinder is a pneumatic cylinder.

7. The method of claim 5, wherein the fluid-controlled cylinder is a hydraulic cylinder.

8. The method of claim 5, wherein the valve is a poppet valve.

9. A TEM machine having a gas handling system in which the improvement is a fluid-controlled pressure regulation subsystem for controlling the dispensing of at least one of the TEM process gases, the fluid-controlled pressure regulation subsystem comprising:

a) a pressure regulator having:
1) a gas inlet and a gas outlet;
2) a valve adapted to control process gas flow between the gas inlet and the gas outlet;
3) a diaphragm in mechanical communication with the valve; and
4) a fluid-controlled cylinder having a piston movably disposed therein in mechanical communication with the diaphragm;

b) a pressure transducer in fluid communication with the gas outlet for monitoring the process gas pressure; and c) a digital controller adapted to receive a signal from the pressure transducer;

wherein the digital controller uses the pressure transducer signal to control the position of the piston within the cylinder thereby controlling the flexure state of the diaphragm, the flexure state of the diaphragm controlling the openness state of the valve, the openness state of the valve controlling the process gas pressure exiting the gas outlet.

10. The TEM machine of claim 9, wherein the fluid-controlled cylinder is a pneumatic cylinder.

11. The TEM machine of claim 9, wherein the fluid-controlled cylinder is a hydraulic cylinder.

12. The TEM machine of claim 9, wherein the valve is a poppet valve.

13. The TEM machine of claim 9, further comprising a data processor and an electronically-accessible database, wherein the data processor electronically communicates with the database to obtain information related to a target pressure of at least one of the process gases.

14. The TEM machine of claim 13, further comprising an overall process controller, wherein the overall process controller controls the overall operation of the TEM machine.

15. The TEM machine of claim 14, wherein at least one selected from the set consisting of the data processor, the database, and the digital controller of the fluid-controlled pressure regulation subsystem is part of the overall processor controller.

16. The TEM machine of claim 9, further comprising a process controller, wherein the overall process controller controls the overall operation of the TEM machine.

17. The TEM machine of claim 16, wherein the digital controller of the fluid-controlled pressure regulation subsystem is part of the overall processor controller.

\* \* \* \* \*